P. GENTILE & A. DEL GIUDICE.
AIR BRAKE TUBE CONNECTION.
APPLICATION FILED NOV. 11, 1912.
1,070,885.
Patented Aug. 19, 1913.
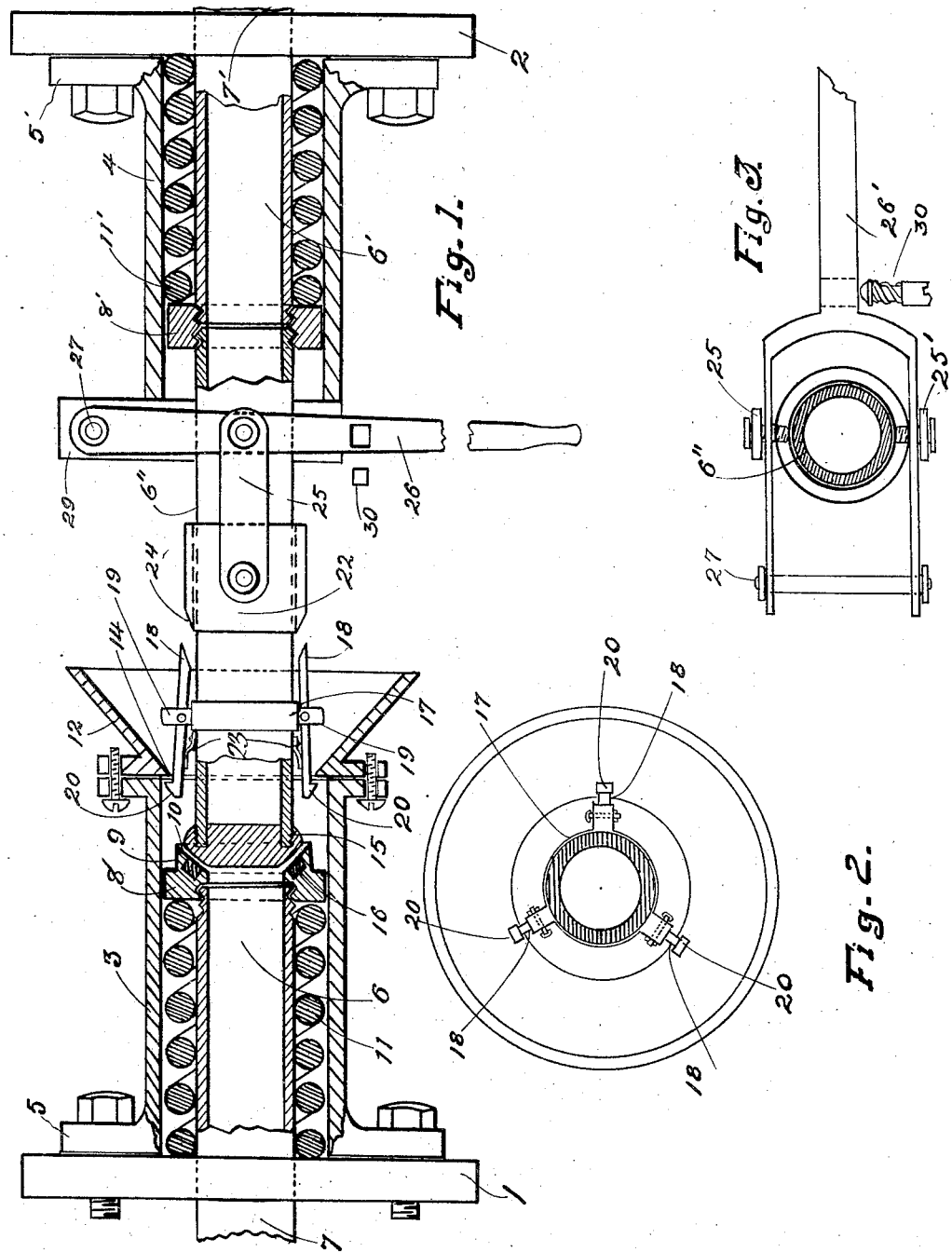
WITNESSES:
H. Harold
John F. Hayes
INVENTORS.
Pasquale Gentile
Angelo Del Giudice
BY George W. Upton
Attorney.

UNITED STATES PATENT OFFICE.

PASQUALE GENTILE, OF NILES, AND ANGELO DEL GIUDICE, OF YOUNGSTOWN, OHIO.

AIR-BRAKE-TUBE CONNECTION.

1,070,885.

Specification of Letters Patent. Patented Aug. 19, 1913.

Application filed November 11, 1912. Serial No. 730,648.

*To all whom it may concern:*

Be it known, that we, PASQUALE GENTILE and ANGELO DEL GIUDICE, citizens of Italy, residing at Niles and Youngstown, respectively, in the counties of Trumbull and Mahoning and State of Ohio, have invented certain new and useful Improvements in Air-Brake-Tube Connections, of which the following is a specification.
Our invention relates to improvements in air brake tube connections in which air brake tubes attached to one car are coupled with air brake tubes attached to another car when trains are made up; and the objects of our improvements are, first, to provide hollow connecting heads for the ends of said air brake tubes or hose, which heads will permit of a continuous passage of air through the tubes of both cars and, when connected, will remain coupled until they are intentionally separated; second, to provide means for connecting the air brake tubes of cars which will not operate so as to lock or permanently couple them together while cars are being shunted in railway yards or while making up trains; and, third, to obviate the necessity of entrance between cars by trainmen to unite or disconnect the respective ends of the air brake tubes of adjoining cars.

We attain these objects by the mechanism illustrated in the accompanying drawings, in which—

Figure 1 is a top view of our invention partly in section; and Figs. 2 and 3 are views of details.

Similar characters refer to similar parts throughout the several views.

1 and 2 are base plates of any convenient shape or size which we bolt to opposite ends of a car.

3 and 4 are cylindrical sustaining cases having annular shoulders 5, 5', attached rigidly to plates 1 and 2.
6 and 6' are tubes, preferably metallic, passing through cases 3 and 4, and attached at their inner ends 7, 7', to the air brake tubes of the train. At the outer end of the tube 6 we thread on a ring 8 having an annular extension 9, with a countersunk face 10, embedded in which is a gasket 16 to form an air-tight contact with the head 15. Between the ring 8 and the plate 1 we surround the tube 6 with a spiral spring 11, the function of which is to press the tube 6 outward and retain it in air-tight contact with the outer end of air tube 6' of the next car. On the outside end of case 3 we attach, in any manner, a guiding funnel 12 with a mouth much wider than the diameter of the tube 6' and having an annular projection 14 produced by making the circumference of the funnel's inner opening somewhat larger than the tube 6' and smaller than the interior of the case 3. For convenience of assembling we extend the tube 6' only so far as to terminate within the case 4, near its outer end, and thread thereon a collar or ring 8', between which and the plate 2 we place a spiral spring 11'. Threaded into the ring 8' is an extension 6", of the tube 6', on the extreme outer end of which is removably attached a hollow head 15 positioned to contact with the face 10 at the end of tube 6, to make an air tight connection of tube 6 with tube 6".

To hold the air brake tubes 6 and 6" in locked relation we clamp or weld on to tube extension 6", near its outer end, an exterior ring 17, shown in Fig. 2, having a plurality of keys 18, 18 fulcrumed thereon near their middles, to offsets 19, 19 and having their outer ends 20, 20 projected outward so as to allow them to lock on the inner face of the protruding wall of funnel 12, within the case 3, and having their other ends slightly beveled outwardly to readily receive the tapered end of lock opener 22.

Springs 23, 23 are attached at one end to the exterior of tube extension 6" so that their other ends serve to normally hold the keys out and in locked relation with the funnel 12.

The lock opener 22 is a tube with a beveled end 24 and sleeved on the tube extension 6" so that when it is moved toward the latter's extremity its beveled end passes under the outer ends of the keys 18, 18, raises them and unlocks their ends 20, 20 so that the tube 6' can be withdrawn from the funnel 12 thus disconnecting the air brake tubes.

An arm 25 is pivotally attached to the opener 22 and to a lever 26 fulcrumed at 27 to any rigid part of, or attachment to the case 4, the plate 2 or the car platform, as may be convenient. We have illustrated it as attached to a projection 29 of the case 4.

In practice a smoother movement will be given to the opener 22 if a second arm 25' is used on the opposite side of tube 6", together with a forked lever 26', instead of lever 26, as shown in Fig. 3, and also more safety will be assured, since in case one arm breaks the other will serve. The lever 26 is made long enough so that its handle will extend to or beyond the outer walls of the car or so it can be operated by a trainman without going between the cars.

It will be noted that it will be practicable to operate our mechanism and to slide said opener 22 forward or backward, when desirable, as in long made up trains, by means of cords or other devices attached thereto or to the respective levers 26, after the manner of the conductor's "bell cords" in present use, or by equivalents, without departing from our invention.

In practice when one car is pushed up against another the head 15 will contact with the ring 8 and the keys 18, 18 will lock the air tubes. When it is desirable to separate the cars a trainman will throw the lever 26 toward the adjacent car and the opener 22 will unlock the air tubes and permit of the withdrawal of the head 15 from the funnel 12.

When it is desirable to "shunt" cars as in a railroad yard, to push and pull them alternately as in making up a train, the lever 26 may be thrown outwardly as to the rear of the car to which it is attached, where it may be temporarily locked by any form of snap catch, spring held peg or dog 30, thus sliding the opener outwardly toward head 15, sufficiently to hold the beveled ends of keys 18, 18 open and prevent the locking of the air tubes until the lever 26 is released and thrown back to the position shown in Fig. 1.

We claim:

1. The combination of a plurality of air brake tubes, cylindrical cases inclosing the projecting ends of said air brake tubes; a receiving funnel whose lesser opening is smaller than the interior of said cases rigidly attached to one of said cases; an annular, beveled rigid end on one of said tubes forming a seat; spring controlled means for extending said tube outwardly, and a gasket in said seat, with a hollow head, to correspond with said valve seat, and attached to the end of the other of said air brake tubes; spring controlled means for extending said second tube outwardly; a plurality of spring sustained keys on said second tube to lock with said funnel; a tapered cylindrical opener sleeved on said second tube; a lever movably attached to the car end nearest said second tube, and an arm connecting said lever with said opener, as shown and described.

2. Means for automatically uniting air brake tubes of cars, consisting of casings adapted to be attached to cars, a funnel attached to one casing, said funnel having an opening smaller in diameter than the casing to which it is attached, a spring controlled tube end incased behind said funnel, a like spring controlled tube end incased in part by the other casing, and a plurality of spring actuated keys on said second tube to automatically lock within said funnel when said cars are brought together.

3. Means for manually disconnecting coupled air brake tubes of cars comprising a funnel shaped receptacle surrounding the end of the air tube on one car; an interior annular face on said funnel; a plurality of spring controlled locking keys positioned about the end of the air tube of the other car; a sleeved wedge on said second tube end and a lever operating said wedge and extending horizontally outward far enough to be reached without entrance between said cars.

4. In a device of the kind described, air brake tubes; a spring controlled seat on one air brake tube; a casing inclosing the end of said tube; a funnel on the outer end of said casing; a hollow head on the end of the other air brake tube; a spring control therefor; spring actuated locking keys thereon; a wedged opener sleeved on said second tube; an actuating lever and an arm connecting said opener and lever.

In testimony whereof we affix our signatures in presence of two witnesses.

PASQUALE GENTILE.
ANGELO DEL GIUDICE.

Witnesses:
G. H. PRIER,
H. HAROLD.

Copies of this patent may be obtained for five cents each, by addressing the "Commissioner of Patents, Washington, D. C."